United States Patent [19]

Ogawa et al.

[11] Patent Number: 4,634,632

[45] Date of Patent: Jan. 6, 1987

[54] MAGNETIC RECORDING MEDIUM

[75] Inventors: Hiroshi Ogawa; Shinji Saito; Yasuo Tamai, all of Kanagawa, Japan

[73] Assignee: Fuji Photo Film Co., Ltd., Kanagawa, Japan

[21] Appl. No.: 680,217

[22] Filed: Dec. 10, 1984

[30] Foreign Application Priority Data

Dec. 9, 1983 [JP] Japan .................................. 58-233076

[51] Int. Cl.$^4$ ............................................. G11B 5/76
[52] U.S. Cl. ............................ 428/425.9; 252/62.54; 360/134; 360/135; 360/136; 427/128; 427/131; 428/522; 428/521; 428/694; 428/695; 428/900
[58] Field of Search ............ 428/694, 695, 900, 425.9, 428/522, 521; 427/128, 131; 360/134–136; 252/62.54

[56] References Cited

U.S. PATENT DOCUMENTS

| | | | |
|---|---|---|---|
| 4,409,291 | 10/1983 | Ogawa | 428/425.9 |
| 4,411,957 | 10/1983 | Tokuda | 428/694 |
| 4,414,288 | 11/1983 | Kawahara | 428/694 |
| 4,429,010 | 1/1984 | Shibata | 428/694 |
| 4,510,203 | 4/1985 | Ogawa | 428/900 |

FOREIGN PATENT DOCUMENTS

| | | | |
|---|---|---|---|
| 0167772 | 12/1981 | Japan | 252/62.54 |
| 0994532 | 2/1983 | U.S.S.R. | 252/62.54 |

*Primary Examiner*—Ellis P. Robinson
*Attorney, Agent, or Firm*—Sughrue, Mion, Zinn, Macpeak, and Seas

[57] ABSTRACT

A magnetic recording medium having excellent electromagnetic properties and satisfactory running durability prepared by mixing a highly concentrated solution of copolymers for vinyl chloride, vinyl acetate and vinyl alcohol with ferromagnetic particles and kneading them, and then adding a solution of rubber type resins and additives thereto and dispersing them, and if desired, by adding and mixing polyisocyanate compounds therewith.

29 Claims, No Drawings

MAGNETIC RECORDING MEDIUM

FIELD OF THE INVENTION

The present invention relates to a magnetic recording medium, and more particularly it relates to a magnetic recording medium having excellent running properties and durability.

BACKGROUND OF THE INVENTION

Magnetic recording material, particularly an audio cassette tape has recently been used for recording music. As a result, the material must have a low harmonic distortion factor, excellent electromagnetic properties as well as excellent running properties and durability.

High density recording has been realized in a video cassette tape by shortening the recording wave length and narrowing the width of the tape. For high density recording, a tape must have high output, a high S/N ratio and excellent electromagnetic properties. The total thickness of the tape becomes very thin, for example 20 μm or less, and a VTR tape must have far better running durability. That is, both audio cassette tapes and video cassette tapes must have much better electromagnetic properties, running properties and durabilities.

Various binder compositions have been proposed to meet the above requirements, but satisfactory binder composition has not yet been found.

Currently, a mixture of copolymers of vinyl chloride, vinyl acetate and other vinyl compounds with rubber type resins is mainly used as a binder composition in view of its dispersibility of ferromagnetic particles and running properties and durability of a magnetic layer. Copolymers of vinyl chloride, vinyl acetate and other vinyl compounds include compolymers of vinyl chloride, vinyl acetate and vinyl alcohol, and copolymers of vinyl chloride, vinyl acetate and maleic anhydride as described in, for example, U.S. Pat. Nos. 2,607,710, 2,885,365, 3,242,005, 3,247,017, 3,404,997, 3,597,273, 3,650,828, 4,238,548, 4,323,628, 4,340,644, 4,352,859, 4,388,376, 4,409,291, 4,409,299, 4,411,957 and 4,414,288. Copolymers of vinyl chloride, vinyl acetate and vinyl alcohol are more frequently used because these copolymers are very effective for dispersing ferromagnetic particles.

However, a magnetic recording medium having excellent electromagnetic properties and satisfactory running durability cannot be obtained using copolymers of vinyl chloride, vinyl acetate and vinyl alcohol.

U.S. Pat. No. 3,728,262 discloses a process in which ferromagnetic particles are treated with a diluted solution of copolymers of vinyl chloride, vinyl acetate and vinyl alcohol with stirring. However, this process does not give rise to a magnetic recording medium having excellent electromagnetic properties and satisfactory running durability.

SUMMARY OF THE INVENTION

A First object of the present invention is to provide a magnetic recording medium having excellent electromagnetic properties.

A second object of the present invention is to provide a magnetic recording medium having excellent running durability.

In this connection, extensive research has been made on various binder composition, dispersing methods and the order of addition of compositions and it has now been found that a magnetic recording medium having excellent electromagnetic properties and satisfactory running durability can be obtained by mixing a highly concentrated solution of copolymers of vinyl chloride, vinyl acetate and vinyl alcohol with ferromagnetic particles and kneading them (first step), by adding a solution of rubber type resins and additives thereto and dispersing them (second step) and, if necessary, by adding and mixing polyisocyanate compounds therewith (third step).

DETAILED DESCRIPTION OF THE INVENTION

The above objects can be attained in one embodidment by a magnetic recording medium prepared by mixing solution of copolymers of vinyl chloride, vinyl acetate and vinyl alcohol containing 3 to 20 wt.% vinyl alcohol, the concentration of the solution being 15 wt% or more, with ferromagnetic particles and kneading them in a first step, adding rubber type resins and additives thereto, dispersing and coating the resulting magnetic coating composition on a non-magnetic support in a second step.

The above objects can be attained in another embodiment by a magnetic recording medium prepared by mixing solution of copolymers of vinyl chloride, vinyl acetate and vinyl alcohol containing 3 to 20 wt.% vinyl alcohol, the concentration of the solution being 15 wt% or more; with ferromagnetic particles and kneading them in a first step, adding rubber type resins and additives thereto, dispersing them in a second step, mixing polyisocyanate compounds therewith and coating the resulting magnetic coating composition on a non-magnetic support in a third step.

The mixing ratio of copolymers of vinyl chloride, vinyl acetate and vinyl alcohol containing vinyl alcohol used in the first step of the present invention is 77 to 97 wt.%, preferably 80 to 95 wt%, of vinyl chloride, 0.1 to 10 wt%, preferably 0.5 to 3 wt.% of vinyl acetate and 3 to 20 wt.% of vinyl alcohol, preferably 5 to 15 wt.%, of vinyl alcohol, and more preferably 10 to 15 wt.%, of vinyl alcohol. The degree of polymerization is 200 to 600, preferably about 300 to 500, and the molecular weight distribution (MW/MN) is 1.0 to 3.0.

When the mixing ratio of vinyl alcohol is 3 wt.% or less, electromagnetic properties of the resulting magnetic recording medium are not improved. When it is about 20 wt.% or more, dissolution of copolymers into a solvent is reduced.

When the degree of polymerization is 200 or less, satisfactory durability cannot be obtained. When it is 600 or more, dissolution of copolymers into a solvent is decreased.

The molecular weight distribution cannot theoretically be 1.0 or less. When it is 3.0 or more, sufficient durability cannot be obtained.

The highly concentrated solution of copolymers of vinyl chloride, vinyl acetate and vinyl alcohol used in the present invention has a concentration of about 15 wt.% or more, preferably 20 wt.% or more, more preferably 30 wt.% to 50 wt.%.

Where the concentration is lower than 15 wt.%, electromagnetic properties can hardly be improved.

Where concentration is higher than 50 wt.%, the viscosity of the solution becomes too high, and the solution becomes a gel state, which is difficult to handle.

Copolymers of vinyl chloride, vinyl acetate and vinyl alcohol having a high amount of vinyl alcohol can be used without being accompanied with the problems regarding running properties and durability by providing the mixing and kneading treatment in the present invention.

Copolymers of vinyl chloride, vinyl acetate and vinyl alcohols are commercially available under the trade name of "Denka Vinyl 1000G" and "Denka vinyl LOH" manufactured by Denki Kagaku Kogyo K.K., "S-lec A" manufactured by Sekisui Chemical Co., Ltd., "MPR-TA" and "MPR-TA5" manufactured by Nisshin Chemical Co., Ltd., and "VAGH" manufactured by Union Carbide Co.

The solution of copolymers of vinyl chloride, vinyl acetate and vinyl alcohol used in the present invention is used in an amount of 10 to 100 parts by weight, preferably 15 to 40 parts by weight, as solid component per 100 parts by weight of the ferromagnetic particles.

Ferromagnetic particles used in the first step of the present invention include $\gamma$-$Fe_2O_3$, $Fe_3O_4$, Co-modified iron oxide, alloy particles mainly composed of iron, modified barium ferrite and modified strontium ferrite as described in, for example, U.S. Pat. Nos. 3,026,215, 3,031,341, 3,100,194, 3,242,005 and 3,389,014.

The shape of these ferromagnetic particles is acicular, granular, a dice shape, a rice grain shape or tabular.

The particle size of ferromagnetic particles is $1\mu$ or less, preferably $0.5\mu$ or less, and the specific surface area thereof is 20 $m^2/g$ to 200 $m^2/g$, preferably 20 $m^2/g$ to 100 $m^2/g$.

The rubber type resins used in the second step of the present invention include resins such as a polyurethane rubber (a polyurethane resin), a styrene butadiene rubber, a butadiene rubber, an isoprene rubber, a chloroprene rubber, an isobutylene and isoprene rubber, an acrylonitrile butadiene rubber, a chlorinated butyl rubber, an acryl rubber, and an epichlorohydrin rubber. Of those rubber type resins, a polyurethane rubber (a polyurethane resin) is the most preferred.

A polyurethane rubber is commercially available under the trade name of "Desmocole 110", "Desmocole 130", "Desmocole 176", "Desmocole 400", "Desmocole 420" and "Desmocole 500" manufactured by Sumitomo Bayer Urethane Co., Ltd., "Nipporan 2301", "Nipporan 2304", "Nipporan 3022" and "Nipporan 3109" manufactured by Nippon Polyurethane Co., Ltd., "Pandex T-5201", "Pandex T-5205", "Pandex T-5265", "Crisvon 6109", "Crisvon 6407", "Crisvon 6208", "Crisvon 7309", "Crisvon 7319", "Crisvon 7209" and "Crisvon 4216" manufactured by Dai-Nippon Ink & Chemicals, Inc.

The amount of the rubber type resin in the total binder is 0 to 60 wt%, preferably 5 to 50 wt% and more preferably 10 to 40 wt% based on the weight of the total binder.

Additives used in the second step of the present invention are dispersing agents, lubricating agents, stabilizing agents, abrasive agents and antistatic agents.

The dispersing agents include conventional dispersing agents for pigment and surface active agents such as a fatty acid having 12 to 18 carbon atoms ($R_1COOH$, wherein $R_1$ is an alkyl group having 11 to 17 carbon atoms) such as capric acid, caprylic acid, lauric acid, myristic acid, palmitic acid, stearic acid, oleic acid, elaidic acid, linolic acid, linolenic acid or stearolic acid; metal soap of alkali metal (Li, Na, K and the like) or alkaline earth metal (Mg, Ca, Ba) of the fatty acid; a fluorine-containing fatty acid; and amide of the fatty acid; an aliphatic amine; higher alcohols; polyalkylene oxide alkyl phosphate; alkyl phosphate, alkyl borate; sarcosinates; alkyl ether esters; trialkyl polyolefin oxyquaternary ammonium salt; and lecithin.

These dispersing agents can be used in an amount of 0.1 to 10 parts by weight, preferably 0.5 to 5 parts by weight based on 100 parts by weight of the ferromagnetic particles.

The lubricating agents used in the present invention include known lubricating agents and lubricating agents for plastics such as the above described fatty acids; higher alcohols; fatty acid esters consisting of monobasic fatty acid having 12 to 20 carbon atoms such as butyl stearate or sorbitan oleate and monovalent or polyhydric alcohols having 3 to 20 carbon atoms; silicone oil such as dimethyl polysiloxane or methyl phenyl polysiloxane; fatty acid modified silicon compounds, fluoroalkyl polysiloxane; mineral oil; vegetable and animal oil; olefin low polymerization compounds; $\alpha$-olefin low polymerization compounds; graphite particles; molybdenum disulfide particles; or Teflon particles.

These lubricating agents are used in an amount of 0.1 to 10 parts by weight, preferably 0.5 to 5 parts by weight based on 100 parts by weight of the ferromagnetic particles.

The stabilizing agents are conventionally used stabilizing agents for plastics, ultraviolet preventing agents for plastics and antioxidizing agents for plastics such as organic tin compounds, e.g., dibutyltin dilaurate, metal soap of alkaline earth metals of the fatty acid; epoxy compounds, e.g., epoxidated oil; organic phosphites; benzophenone compounds; benzotriazole compounds or phenol type antioxidizing agents.

These stabilizing agents are used in an amount of preferably 0.01 to 10 parts by weight and more preferably 0.05 to 5 parts by weight per 100 parts by weight of the ferromagnetic particles.

The abrasive agents are those generally used such as a $\alpha$-alumina, silicon carbide, chromium oxide, corundum, artificial corundum, diamond, artificial diamond, garnet or emery (main components: corundum and magnetite) and the like. The abrasive agents have an average particle size of 0.05 to 5 $\mu m$, preferably 0.1 to 2 $\mu m$, and are used in an amount of 0.1 to 20 parts by weight, preferably 0.5 to 5 parts by weight based on 100 parts by weight of the ferromagnetic particles.

The antistatic agents are natural surface active agents such as carbon or saponin; nonionic surface active agents such as alkylene oxides, glycerol or glycidol; cationic surface active agents such as higher alkyl amines, quaternary ammonium salts, pyridine and other heterocyclic compounds, phosphoniums or sulfoniums; anionic surface active agents such as carboxylic acid, sulfonic acid, phosphoric acid or a compound having an acid group of sulfate group and phosphate group; and amphoteric surface active agents such as amino acids, amino sulfonic acids, sulfates or phosphates of amino alcohol.

These antistatic agents are used in an amount of preferably 0.01 to 10 parts by weight and more preferably 0.05 to 5 parts by weight per 100 parts by weight of the ferromagnetic particles.

These additives are not necessarily added during the second step, and can be added after the dispersion is terminated in the second step or in the third step. Abrasive agents or carbon can be added in the first step, if necessary.

Polyisocyanates used in the third step of the present invention are a reaction product of 1 mole of trimethylolpropane and 3 moles of diisocyanates such as tolylene diisocyanate, xylylene diisocyanate or hexamethylene diisocyanate, adduct products of 3 moles of hexamethylene diisocyanate and biuret, adduct compounds of 3 moles of tolylene diisocyanate, 2 moles of hexamethylene diisocyanate and isocyanurate, diphenylmethane diisocyanate polymer and isophorone diisocyanate.

These polyisocyanates are commercially available under the trade names of "Coronate L", "Coronate HL", "Coronate 2030", "Milionate MR" and "Milionate MTL" manufactured by Nippon Polyurethane Co., Ltd., "Desmodur L", "Desmodur N", "Desmodur IL" and "Desmodur HL" manufactured by Sumitomo Bayer Urethane Co., Ltd., "Takenate D-102", "Takenate D-110N" and "Takenate D-202" manufactured by Takeda Chemical Industries, Ltd.

The amount of the binder (total amount of copolymers of vinyl chloride, vinyl acetate and vinyl alcohol, rubber type resins and polyisocyanates) of the present invention is preferably 10 to 100 parts, and more preferably 15 to 20 parts by weight based on 100 parts by weight of the ferromagnetic particles.

The solvents used in the first step through third step of the present invention are those which dissolved copolymers of vinyl chloride, vinyl acetate and vinyl alcohol and rubber type resins and have a boiling point of 50° C. to 200° C., more preferably 80° C. to 160° C. When polyisocyanates are used in this invention, those polyisocyanates haivng no active hydrogen groups should be used.

The solvents are used alone or in combination. As long as the solvents used in combination can dissolve copolymers and the resins, some solvents which do not dissolve copolymers of vinyl chloride, vinyl acetate and vinyl alcohol and rubber type resins alone can be used together.

The organic solvents include alcohols such as ethanol, n-propanol, isopropanol or n-butanol; ketones such as methylethyl ketone, methyl isobutyl ketone or cyclohexanone; acetic acid esters such as ethyl acetate or butyl acetate; and hydrocarbons such as toluene or xylene.

Other organic solvents such as cellosolves, chlorinated hydrocarbons, nitrated hydrocarbons or formamides can also be used.

In the first step of the present invention, a mixture of a solution of copolymers of vinyl chloride, vinyl acetate and vinyl alcohol and ferromagnetic particles having a viscosity of about 1000 poises or more is mixed and kneaded. Mixing and kneading are carried out by a known kneader such as an open kneader, a kneader used under pressure, a helical kneader, a continuous kneader, a three roll mill, a taper roll, an internal mixer or a Bambury's mixer.

Of these kneaders, an open kneader, a kneader used under pressure and a continuous kneader are most preferred.

Where the concentration of a solution of copolymers of vinyl chloride, vinyl acetate and vinyl alcohol is 15 wt.% or less, the electromagnetic properties of the resulting magnetic recording medium cannot be improved, because it is believed that the mixture of the copolymers and ferromagnetic particles has a low viscosity and therefore is not completely mixed and kneaded.

Where concentration of a solution of copolymers of vinyl chloride, vinyl acetate and vinyl alcohol is about 50 wt.% ore more, the electromagnetic properties of the resulting magnetic recording medium cannot be improved.

Dispersing can be carried out in the second step by a dispersing device such as a ball mill, an attriter, a sand grinder or a vibrating mill. Of these dispersing devices, a ball mill and a sand grinder are the most preferred.

The viscosity of the dispersion is about 1 poise to 500 poises, preferably about 10 poises to 200 poises.

If the viscosity is less than about 1 poise and more than about 500 poises, the mixture of copolymers and particles is not well dispersed and the electromagnetic properties of the resulting magnetic recording medium are not superior.

The coating methods used in the present invention are disclosed in Japanese Patent Publication (unexamined) Nos. 108,804/77, 21,805/79 and 46,011/79.

The present invention is illustrated in more detail by the following Examples and Comparative Examples, but should not be limited thereto.

In the examples and comparative examples, all parts are by weight.

EXAMPLE 1 AND COMPARATIVE EXAMPLE 1

| | |
|---|---|
| $\gamma$-Fe$_2$O$_3$ (Hc 400 Oe, acicular ratio 10/1, average particle length 0.3$\mu$, specific surface area 22 m$^2$/g) 100 parts | 100 parts |
| Butyl acetate solution of copolymers of vinyl chloride, vinyl acetate and vinyl alcohol (86/1/13 wt %) (trade name of "MPR-TA5" manufactured by Nisshin Chemical Co., Ltd.; polymerization degree 320) The concentration is shown in Table 1 | 18 parts (solid content) |

The above compositions were mixed and kneaded for 2 hours by an open kneader.

The mixture was put in a ball mill, the fllowing compositions were added thereto and were dispersed for 48 hours.

| | |
|---|---|
| 30 wt % ethyl acetate solution of polyester polyurethane in the trade name of "Crisvon 7209" manufactured by Dai-Nippon Ink & Chemicals, Inc. (Number Average Molecular Weight: 20,000) | 10 parts |
| Oleic acid | 2 parts |
| Silicone oil (polymerization degree about 60) | 0.5 parts |
| Butyl acetate | to make total solution 350 parts |

The dispersion was filtrated by a filter having an average pore diameter of 3$\mu$ to prepare a coating compositon for a magnetic layer.

The thus obtained coating composition was coated by a reverse roll to have a dry thickness of 5$\mu$ on a polyethylene terephthalate film having a thickness of 7$\mu$. While the coating layer was undried, the layer was sibjected to magnetic orientation using electromagnets having 1000 gauss and was dried. After the layer was dried, it was subjected to super-calendering treatment with a roll to make the magnetic layer smooth, which was then slit to a width of 3.81 mm to prepare an audio cassette tape (Phillips type compact cassette tape).

Characteristics of thus obtained tape are shown in Sample Nos. 1 to 3 and in Comparative Sample No. C-1 in Table 1.

EXAMPLE 2

The same procedure as in Example 1 was repeated except that copolymers of vinyl chloride, vinyl acetate and vinyl alcohol (91/3/6 wt%) under the trade name of "S-lec A" manufactured by Sekisui Chemical Co., Ltd. was used instead of copolymers of vinyl chloride, vinyl acetate and vinyl alcohol (86/1/13 wt%) of Example 1 to prepare an audio cassette tape.

Characteristics of the tape are shown in Sample No. 4 of Table 1.

COMPARATIVE EXAMPLE 2

The same procedure as in Example 1 was repeated except that copolymers of vinyl chloride and vinyl acetate (88/12 wt%) in the trade name of "S-lec C" manufactured by Sekisui Chemical Co., Ltd. was used instead of the copolymer of vinyl chloride, vinyl acetate and vinyl alcohol (86/1/13 wt%) of Example 1 to prepare an audio casette tape.

The characteristics of the tape are shown in Sample No. C-2 of Table 1.

COMPARATIVE EXAMPLE 3

In addition to the ferromagnetic particles and the solution of copolymers of vinyl chloride, vinyl acetate and vinyl alcohol used in Example 1, the polyester polyurethane solution as used in Example 1 was added and they were mixed and kneaded by an open kneader.

The mixture was put in a ball mill and the same procedure as in Example 1 was repeated except that the polyurethane solution was not added during dispersing to prepare an audio cassette tape.

The characteristics of the tape are shown in Sample No. C-3 of Table 1.

COMPARATIVE EXAMPLE 4

The same procedure as in Comparative Example 3 was repeated except that oleic acid and silicone oil were further added in addition to a polyurethane solution and were mixed and kneaded and that only butyl acetate was added after the mixture was put in a ball mill to prepare an audio cassette tape.

The characteristics of the tape are shown in Sample No. C-4 of Table 1.

COMPARATIVE EXAMPLE 5

All of the ferromagnetic particles, binders, additives and solvents of Example 1 were put in a ball mill, and the same procedure as in Example 1 except for the mixing and kneading treatment was repeated to prepare an audio cassette tape.

The characteristics of the tape are shown in Sample No. C-5 of Table 1.

COMPARATIVE EXAMPLE 6

| | |
|---|---|
| γ-Fe$_2$O$_3$ (same as that used in Example 1) | 100 parts |
| 30% butyl acetate solution of copolymer of vinyl chloride, vinyl acetate and vinyl alcohol (same as that used in Example 1) | 60 parts |
| Butyl acetate | 177.5 parts |

The above components were put in a ball mill and dispersed for 24 hours:

| | |
|---|---|
| 30% ethyl acetate solution of polyester polyurethane (same as that used in Example 1) | 10 parts |
| Oleic acid | 2 parts |
| Silicone oil (Polymerization degree about 60) | 0.5 part |

After dispersing the compositions, the above compositions were added thereto and dispersed for 24 hours to prepare a coating composition.

The same procedure as in Example 1 was repeated except as stated above and an audio cassette tape was prepared.

The characteristics of the tape are shown in Sample No. C-6 of Table 1.

EXAMPLE 3 AND COMPARATIVE EXAMPLE 7

| | |
|---|---|
| Co-coated Bertholide iron oxide (Co 2.0 atomic % coating, FeO 1.4, Hc 660 Oe, Acicular ratio 10:1, average particle length 0.3 μm, specific surface area 30 m$^2$/g) | 100 parts |
| Butyl acetate solution of copolymer of vinyl chloride, vinyl acetate and vinyl alcohol (same as those in Example 1) (Concentration is shown in Table 2) | 15 parts by solid content |

The above compositions were mixed and kneaded for 2 hours by an open kneader.

The mixture was put in a tank and the following composition, 3 parts of electroconductive carbon and butyl acetate were added thereto to make the total mixture 330 parts, mixed for 1 hour and dispersed by a sand grinder for 6 hours.

| | |
|---|---|
| 30% Ethyl acetate solution of polyester polyurethane (same as that in Example 1) | 30 parts |
| Oleic acid | 2 parts |
| Butyl stearate | 1 parts |
| α-alumina (average particle diameter 0.3μ) | 2 parts |

The dispersion was introduced into a tank and 8 parts of a polyisocyanate compound under the trade name of "Coronate L-75" manufactured by Nippon Polyurethane Co., Ltd. were added thereto. The mixture was stirred for 1 hour and was filtrated by a filter having an average pore diameter of 1μ to prepare a cotaing compositoin.

The thus obtained coating composition was coated to have a dry thickness of 5μ on a polyethylene terephthalate film having a thickness of 14μ. While the film was undried, the coated layer was usbjeted to magnetic orientation with magnets of 3000 gauss and dried.

After drying, the layer was subjected to super calendering treatment with a roll to make the surface smooth.

The thus obtained bulk roll was subjected to heat treatment to completely harden the magnetic layer and was slit to a width of ½ inch to prepare a video cassette tape.

The characteristics of the tape are shown in Sample No. 5 to 7 and Comparative Sample No. C-7 of Table 2.

EXAMPLE 4

The same procedure as in Example 3 was repeated except that copolymer of vinyl chloride, vinyl acetate and vinyl alcohol (91/3/6 wt%) under the trade name of "S-lec C" manufactured by Sekisui Chemical Co., Ltd. was used in stead of the copolymers of vinyl chloride, vinyl acetate and vinyl alcohol (86/1/13 wt%) of Example 3 to prepare a video cassette tape.

The characteristics of the tape are shown in Sample No. 8 of Table 2.

COMPARATIVE EXAMPLE 8

The same procedure as in Example 3 was repeated except that copolymers of vinyl chloride and vinyl acetate (88/12 wt%) under the trade name of "S-lec C" manufactured by Sekisui Chemical Co., Ltd. were used instead of vinyl chloride, vinyl acetate and vinyl alcohol (86/1/13 wt%) of Example 3 to prepare a video cassette tape.

The characteristics of the tape are shown in Sample No. C-8 of Table 2.

COMPARATIVE EXAMPLE 9

The same procedure as in Example 3 was repeated except that the solution of the polyester polyurethane was further added to the compositions at the mixing and kneading step by an open kneader and that the solution of the polyester polyurethane was not added at the mixing step in a tank to prepare a video tape.

The characteristics of the tape are shown in Sample No. C-9 and Table 2.

COMPARATIVE EXAMPLE 10

The same procedure as in Comparative Example 9 was repeated except that oleic acid, butyl stearate and α-alumina were further added to the compositions at the mixing and kneading step by an open kneader and that only butyl acetate was added in the tank to prepare a video tape.

Characteristics of the tape are shown in Sample No. C-10 of Table 2.

COMPARATIVE EXAMPLE 11

The same procedure as in Example 3 was repeated except that the mixing and kneading treatment of Example 3 was not carried out and that the magnetic particles, the solution of vinyl chloride, vinyl acetate and vinyl alcohol, the solution of polyester polyurethane, oleic acid, butyl stearate, α-alumina, and butyl acetate were mixed in the tank for 1 hour and then were dispersed by a sand grinder for 6 hours to prepare a video tape.

The characteristics of the tape are shown in Sample No. C-11 of Table 2.

TABLE 1-1

| | Sample No. | Copolymers of VC, VAC and VOH | | Time of addition | | | |
| --- | --- | --- | --- | --- | --- | --- | --- |
| | | VC/VAC/VOH | Concentration (%) | Ferromagnetic Particles | Copolymers of VC/VAC/VOH | Polyurethane | Additives |
| Example 1 | 1 | 86/1/13 | 30 | a | a | b | b |
| | 2 | 86/1/13 | 20 | a | a | b | b |
| | 3 | 86/1/13 | 15 | a | a | b | b |
| Example 2 | 4 | 91/3/6 | 30 | a | a | b | b |
| Comparative Example 1 | C-1 | 86/1/13 | 10 | a | a | b | b |
| Comparative Example 2 | C-2 | 88/12/0 | 30 | a | a | b | b |
| Comparative Example 3 | C-3 | 86/1/13 | 30 | a | a | a | b |
| Comparative Example 4 | C-4 | 86/1/13 | 30 | a | a | a | a |
| Comparative Example 5 | C-5 | 86/1/13 | 30 | b | b | b | b |
| Comparative Example 6 | C-6 | 86/1/13 | 30 | b | b | c | c |

TABLE 1-2

| | Sample No. | MOL 315 (dB) | SOL 10K (dB) | Audio running Properties | Level Decrease | Head Staining | Tape Squeal |
| --- | --- | --- | --- | --- | --- | --- | --- |
| Example 1 | 1 | 1.7 | 1.9 | A | A | A | A |
| | 2 | 1.2 | 1.1 | A | A | A | A |
| | 3 | 0.6 | 0.5 | A | A | A | A |
| Example 2 | 4 | 1.0 | 0.6 | A | A | A | A |
| Comparative Example 1 | C-1 | 0.3 | 0.2 | A | A | B | B |
| Comparative Example 2 | C-2 | 0.2 | 0.1 | B | B | B | A |
| Comparative Example 3 | C-3 | 0.8 | 0.1 | B | B | B | C |
| Comparative Example 4 | C-4 | 0.3 | −0.3 | B | B | B | B |
| Comparative Example 5 | C-5 | 0.0 | 0.1 | B | B | B | B |
| Comparative Example 6 | C-6 | 0.0 | 0.2 | B | B | B | B |

TABLE 2-1

| | Sample No. | Copolymers of VC, VAC and VOH | | Time of addition | | | |
| --- | --- | --- | --- | --- | --- | --- | --- |
| | | VC/VAC/VOH | Concentration (%) | Ferromagnetic Particles | Copolymers of VC/VAC/VOH | Polyurethane | Additives |
| | 5 | 86/1/13 | 30 | a | a | d | d |
| Example 3 | 6 | 86/1/13 | 20 | a | a | d | d |
| | 7 | 86/1/13 | 15 | a | a | d | d |
| Example 4 | 8 | 91/3/6 | 30 | a | a | d | d |
| Comparative Example 7 | C-7 | 86/1/13 | 10 | a | a | d | d |
| Comparative Example 8 | C-8 | 88/12/0 | 30 | a | a | d | d |
| Comparative Example 9 | C-9 | 86/1/13 | 30 | a | a | a | d |
| Comparative Example 10 | C-10 | 86/1/13 | 30 | a | a | a | a |
| Comparative Example 11 | C-11 | 86/1/13 | 30 | d | d | d | d |

TABLE 2-2

| | Sample No. | Video Output (dB) | S/N Ratio (dB) | Video Running Properties | Increase of Drop Out | Still Life (min.) | Tape Squeal |
| --- | --- | --- | --- | --- | --- | --- | --- |
| | 5 | 2.4 | 2.8 | A | A | 120 or more | A |
| Example 3 | 6 | 1.7 | 1.9 | A | A | 120 or more | A |
| | 7 | 0.8 | 1.0 | A | A | 120 or more | A |
| Example 4 | 8 | 1.2 | 1.1 | A | A | 120 | A |
| Comparative Example 7 | C-7 | 0.4 | 0.2 | A | B | 80 | B |
| Comparative Example 8 | C-8 | 0.3 | 0.1 | B | B | 50 | A |
| Comparative Example 9 | C-9 | 0.1 | 0.0 | B | B | 40 | B |
| Comparative Example 10 | C-10 | −0.5 | −0.3 | B | B | 30 | B |
| Comparative Example 11 | C-11 | 0.0 | 0.3 | B | C | 40 | B |

Abbreviations used in Tables 1 and 2 are explained below.
VC: vinyl chloride
VAC: vinyl acetate
VOH: vinyl alcohol
a: Time of addition when the composition is mixed and kneaded by an open kneader.
b: Time of addition when the composition begins to be mixed by a ball mill.
c: Time of addition after the composition is dispersed for 24 hours.
d: Time of addition when the composition is mixed in a tank.

Various characteristics of the tapes indicated in Table 1 and 2 were evaluated by the following methods.

(a) MOL 315

The maximum output level at 315 Hz (distortion degree 3%) was measured with a cassette tape deck "582" manufactured by Nakamichi Co., Ltd. using "Fuji Cassette ERC-90" manufactured by Fuji Photo Film Co., Ltd. as a reference tape that was assumed to produce an output of 0 dB.

(b) SOL 10K

The saturated output level at 10 KHz was measured where a reference tape was assumed to deliver an output of 0 dB.

(c) Audio Running Properties

Tape running tests were conducted using 100 commercial cassette tape decks at 25° C. and 50% RH and at 40° C. and 80% RH to see how orderly the tape samples could be wound and the results were evaluated on a four-grade basis.
A: could be orderly wound.
B: could not be orderly wound on 1 to 5 decks.
C: could not be orderly wound on 5 to 10 decks.
D: could not be orderly wound on 11 decks or more.

(d) Level Reduction

Output level reduction at 10 KHz was evaluated at the same time with the tape running tests, and the results were evaluated on a four-grade basis.
A: less than 3 dB.
B: less than 6 dB.
C: less than 9 dB.
D: 9 dB or more.

(e) Head Staining

After evaluation of the tape running properties, the head of each deck was checked for the presence of stain and the results were evaluated on a three-grade basis.
A: Stain was absent or hardly detectable.
B: Some stain but negligible stain.
C: Considerable stain.

(f) Tape Squeal

The presence of any tape squeal was also checked during the tape running tests, and the results were evaluated on a four-grade basis.
A: No tape squeal was heard.
B: Occasional squeals were heard on 1 to 2 cassette tapes.

C: Occasional squeals were heard on 3 to 5 cassette tapes.

D: Occasional squeals were heard on 5 or more cassette tapes and squeals were continuously heard on 2 or more cassette tapes.

(g) Video Output

The output at 4 MHz was measured using "NV-6600" manufactured by Matsushita Electric Industries Co., Ltd. using a VHS tape manufactured by Fuji Photo Film Co., Ltd. as a reference tape that was assumed to deliver an output of 0 dB.

(h) S/N Ratio

The S/N ratio at 10k to 4 MHz after visibility correction was measured with "NV-6600" manufactured by Matsushita Electric Industries Co., Ltd.

(i) Video Running Properties

Video tapes running tests were conducted with 50 commercial VHS video tape decks to see if any jitter or skew occurred at 25° C. and 50% RH and at 40° C. and 80% RH, and the rusults were evaluated on a three-grade basis.

A: No jittering or skewing
B: Some but insignificant jittering or skewing
C: Frequent jittering or skewing caused a problem.

(j) Increase of Drop Out

Increase of drop out was measured at the same time with the video tape running tests, and the results were evaluated on a four-grade basis.

A: Increase of not more than 10 per min.
B: Increase of not more than 20 per min.
C: Increase of not more than 30 per min.
D: Increase of 30 or more per min.

(k) Still Life

The time (min) for a serious defect to occur in a picture reproduced in a still mode was measured using "NV-6600" manufactured by Matsushita Electric Industries Co., Ltd.

(l) Tape Squeal

The same as the tape squeal (f).

It is apparent from a comparison between Sample No. 1 and Sample NO. C-5 and C-6 in Table 1 that an audio tape having better electromagnetic properties and running properties and durability can be obtained by mixing and kneading a highly concentrated solution of copolymers of vinyl chloride, vinyl acetate and vinyl alcohol with ferromagnetic particles.

It is understood from Sample Nos. 1 to 3 and Sample No. C-1 that the electromagnetic properties, running properties and durability are not improved when a low concentrated solution of copolymers of vinyl chloride, vinyl acetate and vinyl alcohol is used at the mixing and kneading step.

It is clear from Sample No. 1 and No. 4 and Sample No. C-2 that the effect of the present invention by providing the mixing and kneading step becomes more remarkable as the ratio of vinyl alcohol in copolymers of vinyl chloride, vinyl acetate and vinyl alcohol becomes higher.

It is understood from Sample No. 1, Sample No. C-3 and C-4 that the effect of the mixing and kneading treatment of the present invention cannot be obtained when a rubber type resin and additives are mixed at the improper time.

The same understanding with that of Table 1 is obtained from Table 2.

It is apparent from the results in Tables 1 and 2 that a magnetic recording medium having excellent electro-magnetic properties, running properties and durability can be obtained by mixing and kneading ferromagnetic particles and a highly concetrated solution of copolymers of vinyl chloride, vinyl acetate and vinyl alcohol, particularly having a high amount of vinyl alcohol.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support having coated thereon a magnetic layer which is prepared by the process comprising
   (1) mixing a solution of at least one copolymer of vinyl chloride, vinyl acetate and vinyl alcohol having 3 to 20 wt.% of vinyl alcohol and a degree of polymerization of 200 to 600, the concentration of the copolymer in the solution being 30 to 50 wt%, with ferromagnetic particles and kneading them, the solution and the ferromagnetic particles having a viscosity of 1,000 poises or more; and
   (2) adding a solution of at least one rubber-type resin and at least one additive thereto and dispersing the resulting composition, which has a viscosity of about 1 poise to 500 poises, to prepare a coating composition.

2. A magnetic recording medium comprising a non-magnetic support having coated thereon a magnetic layer which is prepared by the process comprising
   (1) mixing a solution of at least one copolymer of vinyl chloride, vinyl acetate and vinyl alcohol having 3 to 20 wt.% of vinyl alcohol and a degree of polymerization of 200 to 600, the concentration of the copolymer in the solution being 30 to 50 wt%, with ferromagnetic particles and kneading them, the solution and the ferromagnetic particles having a viscosity of 1,000 poises or more;
   (2) adding a solution of at least one rubber-type resin and at least one additive thereto and dispersing the resulting composition, which has a viscosity of about 1 poise to 500 poises; and
   (3) mixing at least one polyisocyanate compound therewith to prepare a coating composition.

3. The magnetic recording medium as claimed in claim 1, wherein the amount of vinyl alcohol in the at least one copolymer of vinyl chloride, vinyl acetate and vinyl alcohol is 5 to 15 wt.%.

4. The magnetic recording medium as claimed in claim 2, wherein the amount of vinyl alcohol in the at least one copolymer of vinyl chloride, vinyl acetate and vinyl alcohol is 5 to 15 wt.%.

5. The magnetic recording medium as claimed in claim 1, wherein the at least one rubber-type resin is a polyurethane resins.

6. The magnetic recording medium as claimed in claim 2, wherein the rubber-type resin is a polyurethane resin.

7. The magnetic recording medium as claimed in claim 1, wherein the at least one copolymer of vinyl chloride, vinyl acetate and vinyl alcohol has a concentration of 20 wt.% or more.

8. The magnetic recording medium as claimed in claim 2, wherein the at least one copolymer of vinyl chloride, vinyl acetate and vinyl alcohol has a concentration of 20 wt.% or more.

9. A process for preparing a magnetic recording medium comprising
   (1) mixing a solution of at least one copolymer of vinyl chloride, vinyl acetate and vinyl alcohol having 3 to 20 wt.% of vinyl alcohol and a degree of polymerization of 200 to 600, the concentration of the copolymer in the solution being 30 to 50 wt%, with ferromagnetic particles and kneading them, the solution and the ferromagnetic particles having a viscosity of 1,000 poises or more;
   (2) adding a solution of at least one rubber-type resin and at least one additive thereto and dispersing the resulting composition, which has a viscosity of about 1 poise to 500 poises; and
   (3) coating the resulting composition on a non-magnetic support.

10. A process for preparing a magnetic recording medium comprising
    (1) mixing a solution of at least one copolymer of vinyl chloride, vinyl acetate and vinyl alcohol having 3 to 10 wt.% of vinyl alcohol and a degree of polymerization of 200 to 600, the concentration of the copolymer in the solution being 30 to 50 wt%, with ferromagnetic particles and kneading them, the solution and the ferromagnetic particles having a viscosity of 1,000 poises or more;
    (2) adding a solution of at least one rubber-type resin and at least one additive thereto and dispsering the resulting composition, which has a viscosity of about 1 poise to 500 poises to prepare a coating composition;
    (3) mixing at least one polyisocyanate compound therewith to prepare a coating solution; and
    (4) coating the resulting composition on a non-magnetic support.

11. The magnetic recording medium as claimed in claim 1, wherein the amount of vinyl alcohol in the at least one copolymer of vinyl chloride, vinyl acetate and vinyl alcohol is 10 to 15 wt%.

12. The magnetic recording medium as claimed in claim 2, wherein the amount of vinyl alcohol in the at least one copolymer of vinyl chloride, vinyl acetate and vinyl alcohol is 10 to 15 wt%.

13. A magnetic recording medium as claimed in claim 1, wherein mixing and heating are carried out in an open kneader, a kneader under pressure, a helical kneader, a continuous kneader, a three roll mill, a taper roll, an internal mixture or a Banbury's mixer.

14. A magnetic recording medium as claimed in claim 2, wherein mixing and heating are carried out in an open kneader, a kneader under pressure, a helical kneader, a continuous kneader, a three roll mill, a taper roll, an internal mixture or a Banbury's mixer.

15. The magnetic recording medium as claimed in claim 1, wherein the degree of polymerization is 300 to 500.

16. The magnetic recording medium as claimed in claim 2, wherein the degree of polymerization is 300 to 500.

17. The magnetic recording medium as claimed in claim 1, wherein the molecular weight distribution (MW/MN) is 1.0 to 3.0.

18. The magnetic recording medium as claimed in claim 2, wherein the molecular weight distribution (MW/MN) is 1.0 to 3.0.

19. A magnetic recording medium as claimed in claim 1, wherein the solution comprises a solvent having a boiling point of 50° C. to 200° C.

20. A magnetic recording medium as claimed in claim 2, wherein the solution comprises a solvent having a boiling point of 50° C. to 200° C.

21. The magnetic recording medium as claimed in claim 1, wherein the amount of vinyl chloride is 77 to 95 wt% and the amount of vinyl acetate is 0.5 to 3.0 wt%, wherein the total amount of vinyl chloride, vinyl acetate and vinyl alcohol is 100 wt%.

22. The magnetic recording medium as claimed in claim 2, wherein the amount of vinyl chloride is 77 to 95 wt% and the amount of vinyl acetate is 0.5 to 3.0 wt%, wherein the total amount of vinyl chloride, vinyl acetate and vinyl alcohol is 100 wt%.

23. The magnetic recording medium as claimed in claim 1, wherein said at least one rubber type resin is selected from the group consisting of a polyurethane resin, a styrene butadiene rubber, a butadiene rubber, an isoprene rubber, a chloroprene rubber, an isobutylene and isoprene rubber, an acrylonitrile butadiene rubber, a chlorinated butyl rubber, an acryl rubber and an epichlorohydrin rubber.

24. The magnetic recording medium as claimed in claim 2, wherein said at least one rubber type resin is selected from the group consisting of a polyurethane resin, a styrene butadiene rubber, a butadiene rubber, an isoprene rubber, a chloroprene rubber, an isobutylene and isoprene rubber, an acrylonitrile butadiene rubber, a chlorinated butyl rubber, an acryl rubber and an epichlorihydrin rubber.

25. The magnetic recording medium as claimed in claim 1, wherein said at least one additive is selected from dispersing agents lubricating agents, stabilizing agents, adhesive agents and antistatic agents.

26. The magnetic recording medium as claimed in claim 2, wherein said at least one additive is selected from dispersing agents, lubricating agents, stabilizing agents, adhesive agents and antistatic agents.

27. A magnetic recording medium as claimed in claim 2, wherein said at least one polyisocyanate compound is a reaction product of one mole of trimethylol propane and 3 moles of diisocyanates, adduct products of 3 moles of hexamethylene diisocyanate and biuret, adduct compounds of 3 moles of tolylene diisocyanate, 2 moles of hexamethylene diisocyanate and isocyanate, diphenyl methane diisocyanate polymer and isophorone diisocyanate.

28. The magnetic recording medium as claimed in claim 1, wherein dispersing is carried out in a ball mill, an attriter, a sand grinder or a vibrating mill.

29. The magnetic recording medium as claimed in claim 2, wherein dispersing is carried out in a ball mill, an attriter, a sand grinder or a vibrating mill.

* * * * *